US012036795B2

(12) United States Patent
Hayashi et al.

(10) Patent No.: US 12,036,795 B2
(45) Date of Patent: Jul. 16, 2024

(54) RECORDING APPARATUS, METHOD, AND STORAGE MEDIUM

(71) Applicant: CANON KABUSHIKI KAISHA, Tokyo (JP)

(72) Inventors: Masashi Hayashi, Kanagawa (JP); Atsushi Arai, Kanagawa (JP); Takaaki Ishida, Kanagawa (JP); Akira Kida, Kanagawa (JP); Masakazu Tsukuda, Kanagawa (JP); Masaaki Matsuura, Kanagawa (JP); Koki Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 17/936,698

(22) Filed: Sep. 29, 2022

(65) Prior Publication Data

US 2023/0100801 A1 Mar. 30, 2023

(30) Foreign Application Priority Data

Sep. 30, 2021 (JP) ................................ 2021-161546

(51) Int. Cl.
*B41J 2/165* (2006.01)
*B41J 11/00* (2006.01)
*G03G 21/00* (2006.01)

(52) U.S. Cl.
CPC ....... *B41J 2/16535* (2013.01); *B41J 2/16588* (2013.01); *B41J 11/009* (2013.01); *G03G 21/00* (2013.01); *B41J 2002/16573* (2013.01)

(58) Field of Classification Search
CPC .. B41J 2/16535; B41J 2/16588; B41J 11/009; B41J 2002/16573; G03G 21/00
See application file for complete search history.

(56) References Cited

U.S. PATENT DOCUMENTS

2016/0052309 A1* 2/2016 Taguchi ............... B41J 13/0009 347/16

FOREIGN PATENT DOCUMENTS

JP 2001-056627 A 2/2001

* cited by examiner

*Primary Examiner* — Anh T Vo
(74) *Attorney, Agent, or Firm* — Canon U.S.A., Inc. IP Division

(57) ABSTRACT

A recording apparatus includes a print head, a recovery unit, a type obtaining unit, a threshold obtaining unit, and a calculation unit. The print head forms an image by applying a recording material to a recording medium. The recovery unit performs a recovery operation for recovering an ejection state of the print head. The type obtaining unit obtains a type of the recording medium on which the image is to be recorded. The threshold obtaining unit obtains a threshold for performing the recovery operation corresponding to the obtained type of the recording medium. The calculation unit calculates a count-up value by adding, in response to recording on the recording medium, an addition value set for each of types of recording media. The recovery operation is performed in a case where the count-up value calculated by the calculation unit exceeds the threshold obtained by the threshold obtaining unit.

12 Claims, 11 Drawing Sheets

FIG. 9

| MEDIUM TYPE | ADDITION VALUE | MAINTENANCE THRESHOLD |
|---|---|---|
| PLAIN PAPER | 100 | 15000 |
| GLOSSY PAPER | 10 | 1000 |

RECORDING APPARATUS, METHOD, AND STORAGE MEDIUM

BACKGROUND

Field

The present disclosure relates to a recording apparatus, a method, and a storage medium.

Description of the Related Art

In a recording apparatus configured to form an image on a recording medium such as paper by ejecting a recording material such as ink from an ejection opening provided in a print head, when paper fine particles generated from the paper are adhered to the ejection opening, ink ejection is disturbed, and an image quality may be degraded. To deal with this, it has been suggested that a maintenance control for removing the paper fine particles adhered to the print head is performed. With regard to an execution timing for the maintenance control, it is demanded that the maintenance control is executed at a timing at which the image quality is not to be degraded, but when the maintenance control is excessively frequently executed, usability of a user decreases since a period of time in which the recording is interrupted is generated.

Japanese Patent Laid-Open No. 2001-056627 discloses that the amount of paper fine particles generated is calculated according to a type of a recording paper to decide a maintenance timing.

An ease of visual recognition of the image degradation on the recording medium varies depending on a characteristic of the recording medium.

For example, since plain paper has a characteristic with which bleeding of ink easily occurs on a paper surface, even when an ejection failure nozzle where ink is not ejected from the nozzle exists, it is difficult to visually recognize the image degradation because the ink ejected from surrounding nozzles bleeds and spreads. On the other hand, in the case of a recording medium such as glossy paper having a characteristic with which the ink hardly bleeds, when the ejection failure nozzle exists, the ink ejected from the surrounding nozzles hardly bleeds and spreads in a position where the ink is to be ejected from the ejection failure nozzle. For this reason, the position where the ink is to be ejected from the ejection failure nozzle remains as blank, which is easily visually recognized as the image degradation. That is, the number of ejection failure nozzles with which the image degradation is visually recognized differs depending on the recording medium.

Japanese Patent Laid-Open No. 2001-056627 has not mentioned a maintenance execution timing in accordance with a characteristic of the recording medium. For this reason, when the maintenance timing is set in conformity to the recording medium on which it is difficult to visually recognize the image degradation, there is a fear that the image degradation is visually recognized on the recording medium on which it is easy to visually recognize the image degradation. On the other hand, when the maintenance timing is set in conformity to the recording medium on which it is easy to visually recognize the image degradation, the maintenance is to be executed at an excessive frequency in a case where the recording is performed on the recording medium on which it is difficult to visually recognize the image degradation.

SUMMARY

According to an aspect of the present disclosure, a recording apparatus includes a print head configured to form an image by applying a recording material to a recording medium according to image data, a recovery unit configured to perform a recovery operation for recovering an ejection state of the print head, a type obtaining unit configured to obtain a type of the recording medium on which the image is to be recorded according to the image data, a threshold obtaining unit configured to obtain a threshold for performing the recovery operation corresponding to the type of the recording medium which is obtained by the type obtaining unit, and a calculation unit configured to calculate a count-up value by adding, in response to recording on the recording medium, an addition value set for each of types of recording media, wherein the recovery operation by the recovery unit is performed in a case where the count-up value calculated by the calculation unit exceeds the threshold obtained by the threshold obtaining unit.

Further features of the present disclosure will become apparent from the following description of exemplary embodiments with reference to the attached drawings.

BRIEF DESCRIPTION OF THE DRAWINGS

FIG. 9 illustrates an addition value and a maintenance threshold for each type of recording media.

DESCRIPTION OF THE EMBODIMENTS

First Embodiment

Figure 1:
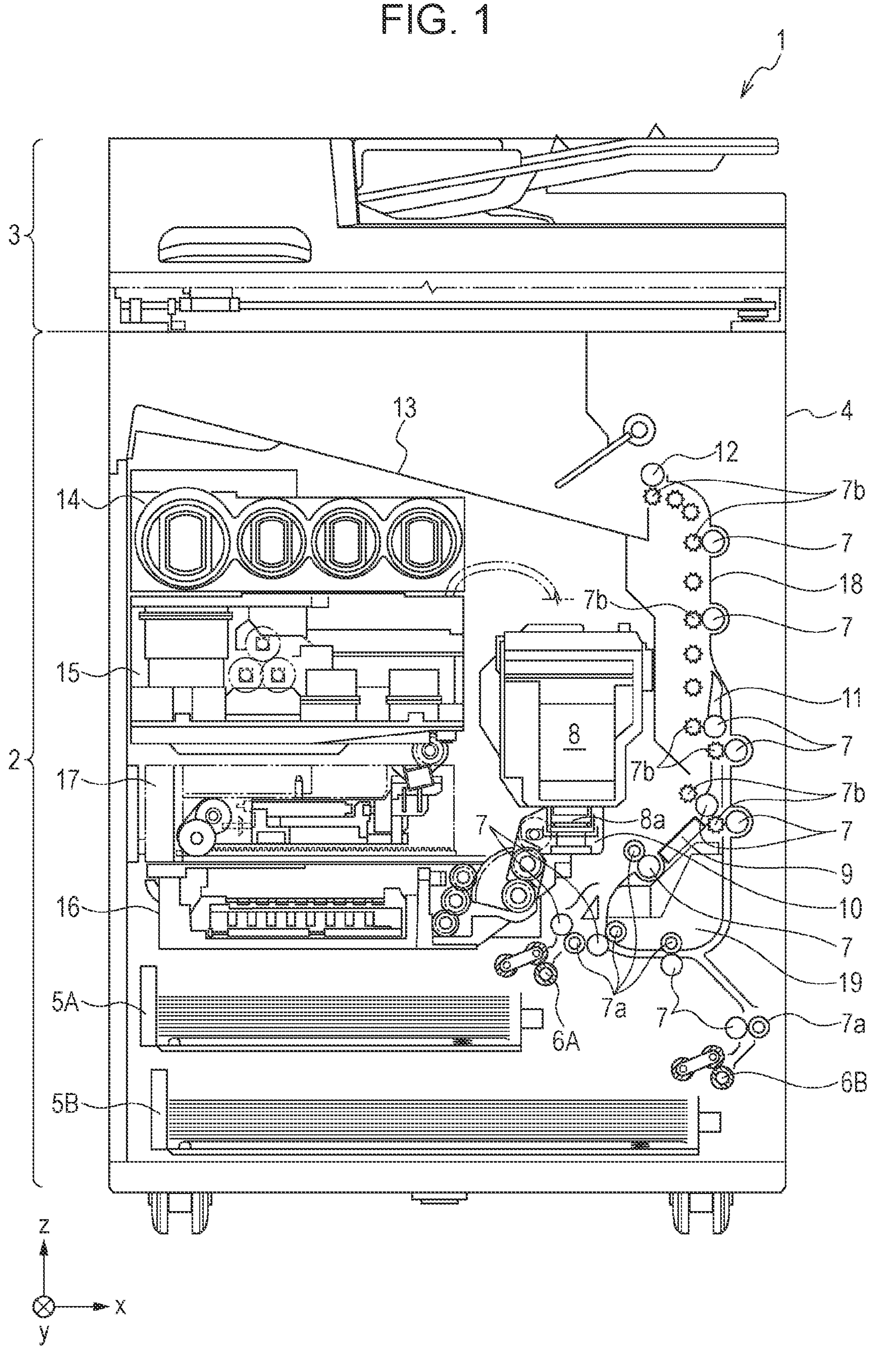
FIG. 1 illustrates a recording apparatus in a stand-by state.

FIG. 1 is an internal configuration diagram of an ink jet recording apparatus 1 (hereinafter, the recording apparatus 1) used according to the present embodiment. In FIG. 1, an x direction indicates a horizontal direction, a y direction (perpendicular direction on a paper surface) indicates a direction of an array of ejection openings in a print head 8 which will be described below, and a z direction indicates a vertical direction.

The recording apparatus 1 is a multi-function peripheral including a printing section 2 and a scanner section 3, and can execute various processes related to a recording operation and a reading operation individually or in a conjunction manner in the printing section 2 and the scanner section 3. The scanner section 3 includes an auto document feeder (ADF) and a flatbed scanner (FBS), and can read a document automatedly fed by the ADF and read (scan) a document placed on a document platen of the FBS by a user.

It is noted that according to the present embodiment, the multi-function peripheral has both the printing section 2 and the scanner section 3, but a configuration may also be adopted where the scanner section 3 is not included. FIG. 1 illustrates the recording apparatus 1 in a stand-by state in which neither the recording operation nor the reading operation is performed.

In the printing section 2, a first cassette 5A and a second cassette 5B arranged to contain a recording medium (cut sheet) S are detachably installed in a bottom section downwards in the vertical direction of a housing 4.

The first cassette 5A contains relatively small recording media up to an A4 size flatly stacked, and the second cassette 5B contains relatively large recording media up to an A3 size flatly stacked. A first feeding unit 6A arranged to separate each one of the contained recording media to be fed is provided in the vicinity of the first cassette 5A. Similarly, a second feeding unit 6B is provided in the vicinity of the second cassette 5B. The recording medium S is selectively fed from any one of the cassettes when the recording operation is to be performed.

Conveyance rollers 7, a discharge roller 12, pinch rollers 7*a*, spur rollers 7*b*, a guide 18, an inner guide 19, and a flapper 11 constitute a conveyance mechanism arranged to guide the recording medium S in a predetermined direction. The conveyance rollers 7 are drive rollers arranged on an upstream side and a downstream side of the print head 8 (platen 9) and driven by a conveyance motor. The pinch rollers 7*a* are follower rollers arranged to nip the recording medium S together with the conveyance rollers 7 and rotate. The discharge roller 12 is a drive roller arranged downstream of the conveyance rollers 7 to be driven by a discharge motor. The spur rollers 7*b* nip and convey the recording medium S together with the conveyance rollers 7 and the discharge roller 12 arranged downstream of the print head 8 (platen 9).

A plurality of motors arranged to drive the above-described drive rollers are provided in the recording apparatus 1, and each of the above-described drive rollers is connected to one of the plurality of motors. A correspondence between the motors and the drive rollers will be described below in detail.

The guide 18 is provided in a conveyance route of the recording medium S and guides the recording medium S in a predetermined direction. The inner guide 19 is a member extending in the y direction with a curved side surface, and guides the recording medium S along the side surface. The flapper 11 is a member arranged to switch a direction of the conveyance of the recording medium S at the time of a double-sided recording operation. A discharge tray 13 is a tray arranged to load and hold the recording medium S discharged by the discharge roller 12 after the completion of the recording operation.

The print head 8 of the present embodiment is a full-line type color ink jet print head, and a plurality of ejection openings from which the ink is ejected according to recording data are arrayed corresponding to the number equivalent to a width of the recording medium S along the y direction in FIG. 1. When the print head 8 is in a stand-by position, an ejection opening surface 8*a* of the print head 8 faces vertically downward as illustrated in FIG. 1, and is capped by a cap unit 10. When the recording operation is performed, an orientation of the print head 8 is changed by a print controller 202 which will be described below such that the ejection opening surface 8*a* faces the platen 9.

The platen 9 is constituted by a flat plate extending in the y direction, and supports the recording medium S on which the recording operation is performed by the print head 8 from a rear side. A movement of the print head 8 from a stand-by position to a recording position will be described below in detail.

An ink tank unit 14 stores each of ink of four colors to be supplied to the print head 8. An ink supply unit 15 is provided in a mid-course of a flow channel connecting the ink tank unit 14 and the print head 8 to each other, and adjusts a pressure and a flow rate of the ink in the print head 8 to be in appropriate ranges. A circulation type ink supply system is adopted according to the present embodiment, and the ink supply unit 15 adjusts the pressure of the ink supplied to the print head 8 and the flow rate of the ink collected from the print head 8 to be in the appropriate ranges.

A maintenance unit 16 includes the cap unit 10 and a wiping unit 17 and actuates these at a predetermined timing to perform a maintenance operation to the print head 8. The maintenance operation will be described below in detail.

Figure 2:
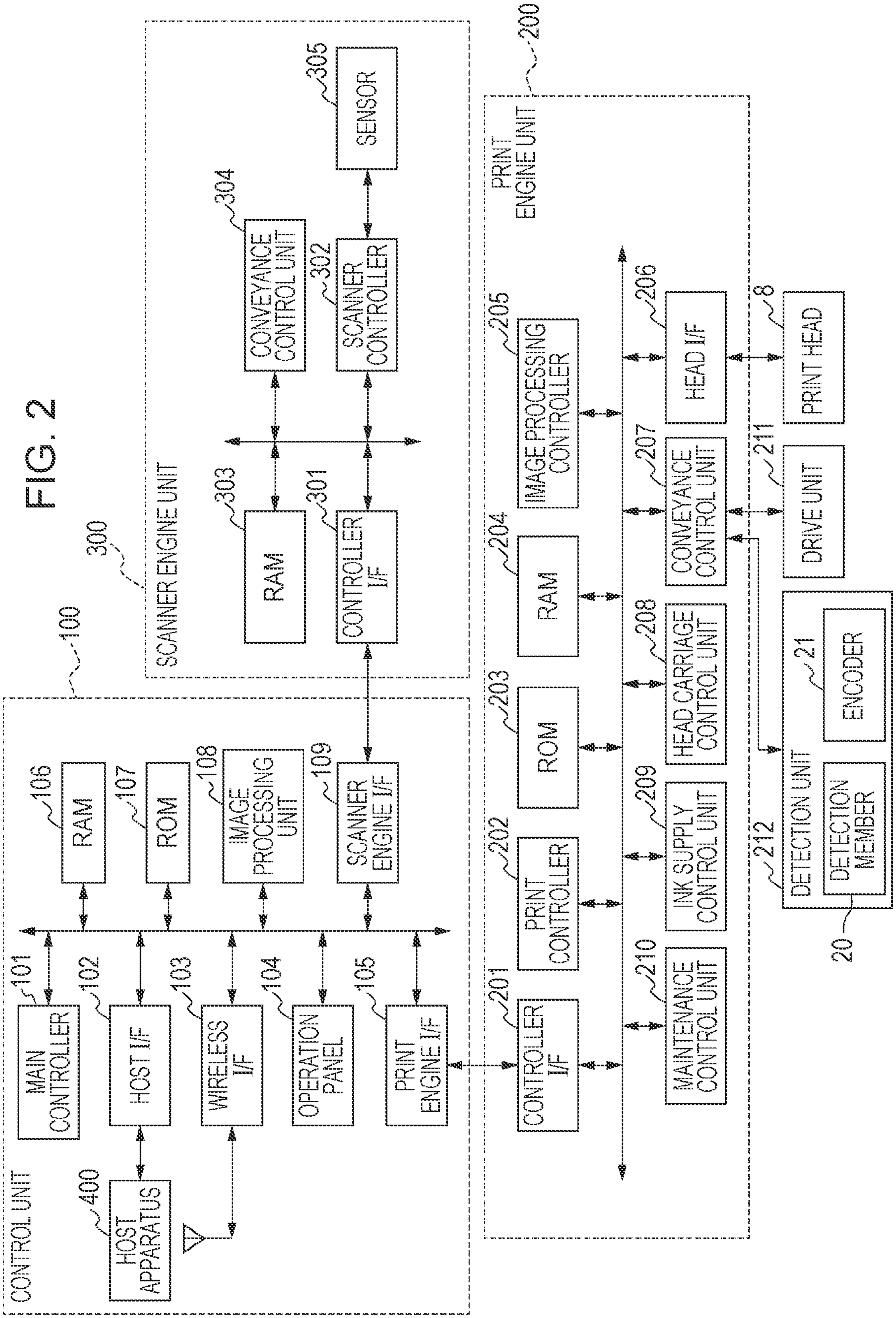
FIG. 2 is a control configuration diagram of the recording apparatus.

FIG. 2 is a block diagram illustrating a control configuration in the recording apparatus 1. The control configuration is mainly constituted by a print engine unit 200 configured to govern the printing section 2, a scanner engine unit 300 configured to govern the scanner section 3, and a controller unit 100 configured to govern an entirety of the recording apparatus 1. The print controller 202 is configured to control various types of mechanisms of the print engine unit 200 according to instructions of a main controller 101 of the controller unit 100. Various types of mechanisms of the scanner engine unit 300 are controlled by the main controller 101 of the controller unit 100. Hereinafter, a detail of the control configuration will be described.

In the controller unit 100, the main controller 101 constituted by a CPU is configured to control the entirety of the recording apparatus 1 according to a program and various parameters stored in a ROM 107 by using a RAM 106 as a work area. For example, a host apparatus 400 can input, via a host I/F 102 or a wireless I/F 103, a recording job in which image data for recording, a recording medium type used for executing the recording, and recording sheet count information are set. When the recording job is input from the host apparatus 400, according to the instruction of the main controller 101, predetermined image processing is applied to image data received by an image processing unit 108. Then, the main controller 101 transmits the image data on which the image processing has been applied to the print engine unit 200 via a print engine I/F 105.

It is noted that the recording apparatus 1 may obtain the image data via a wireless communication or a wired communication from the host apparatus 400, or may also obtain the image data from an external storage (such as a USB memory) connected to the recording apparatus 1. A communication method used for the wireless communication or the wired communication is not limited. For example, Wireless Fidelity (Wi-Fi) (registered trademark) or Bluetooth (registered trademark) may be applied as the communication method used for the wireless communication. In addition, a universal serial bus (USB) may be applied as the communication method used for the wired communication. In addition, for example, when a read command is input from the host apparatus 400, the main controller 101 transmits this command to the scanner section 3 via a scanner engine I/F 109.

An operation panel 104 is a mechanism configured for the user to perform input and output to and from the recording apparatus 1. The user can instruct an operation such as copy or scan via the operation panel 104, set a recording mode, or recognize information of the recording apparatus 1.

In the print engine unit 200, the print controller 202 constituted by the CPU is configured to control various types of mechanisms included in the printing section 2 according to a program and various parameters stored in a ROM 203 by using a RAM 204 as a work area. When various types of commands or image data is received via a controller I/F 201, the print controller 202 temporarily stores this image data in the RAM 204. In order that the print head 8 can use this image data for the recording operation, the print controller 202 causes an image processing controller 205 to convert the saved image data into recording data. When the recording data is generated, the print controller 202 causes, via a head I/F 206, the print head 8 to execute the recording operation based on the recording data. At this time, the print controller 202 drives feeding units 6A and 6B, the conveyance rollers 7, the discharge roller 12, and the flapper 11 which are illustrated in FIG. 1 via a conveyance control unit 207 to convey the recording medium S.

The conveyance control unit 207 is connected to a detection unit 212 configured to detect a conveyance state of the recording medium S and a drive unit 211 configured to drive a plurality of drive rollers. The conveyance control unit 207 controls the conveyance of the recording medium S by using the drive unit 211 based on a detection result obtained from the detection unit 212. The detection unit 212 has detection members 20 configured to detect the presence or absence of the recording medium S and an encoder 21 configured to detect a rotation amount of the drive roller.

In a process of the conveyance of the recording medium S by the conveyance control unit 207, the recording operation by the print head 8 is executed in conjunction with an conveyance operation of the recording medium S according to the instruction from the print controller 202, and the recording processing is performed.

A head carriage control unit 208 is configured to change an orientation or a position of the print head 8 in accordance with an operation state such as a maintenance state or a recording state of the recording apparatus 1. An ink supply control unit 209 is configured to control the ink supply unit 15 such that the pressure of the ink to be supplied to the print head 8 falls within an appropriate range. A maintenance control unit 210 is configured to control the operation of the cap unit 10 or the wiping unit 17 in the maintenance unit 16 when the maintenance operation on the print head 8 is performed.

In the scanner engine unit 300, the main controller 101 controls a hardware resource of a scanner controller 302 according to the program and various parameters stored in the ROM 107 by using the RAM 106 as the work area. Thus, the various types of mechanisms included in the scanner section 3 are controlled. For example, when the main controller 101 controls the hardware resource in the scanner controller 302 via a controller I/F 301, the document placed on the ADF by the user is conveyed via a conveyance control unit 304 and read by a sensor 305. Then, the scanner controller 302 saves the read image data in a RAM 303. It is noted that the print controller 202 converts the image data obtained as described above into the recording data, so that it is possible to cause the print head 8 to execute the recording operation based on the image data read by the scanner controller 302.

Figure 3:
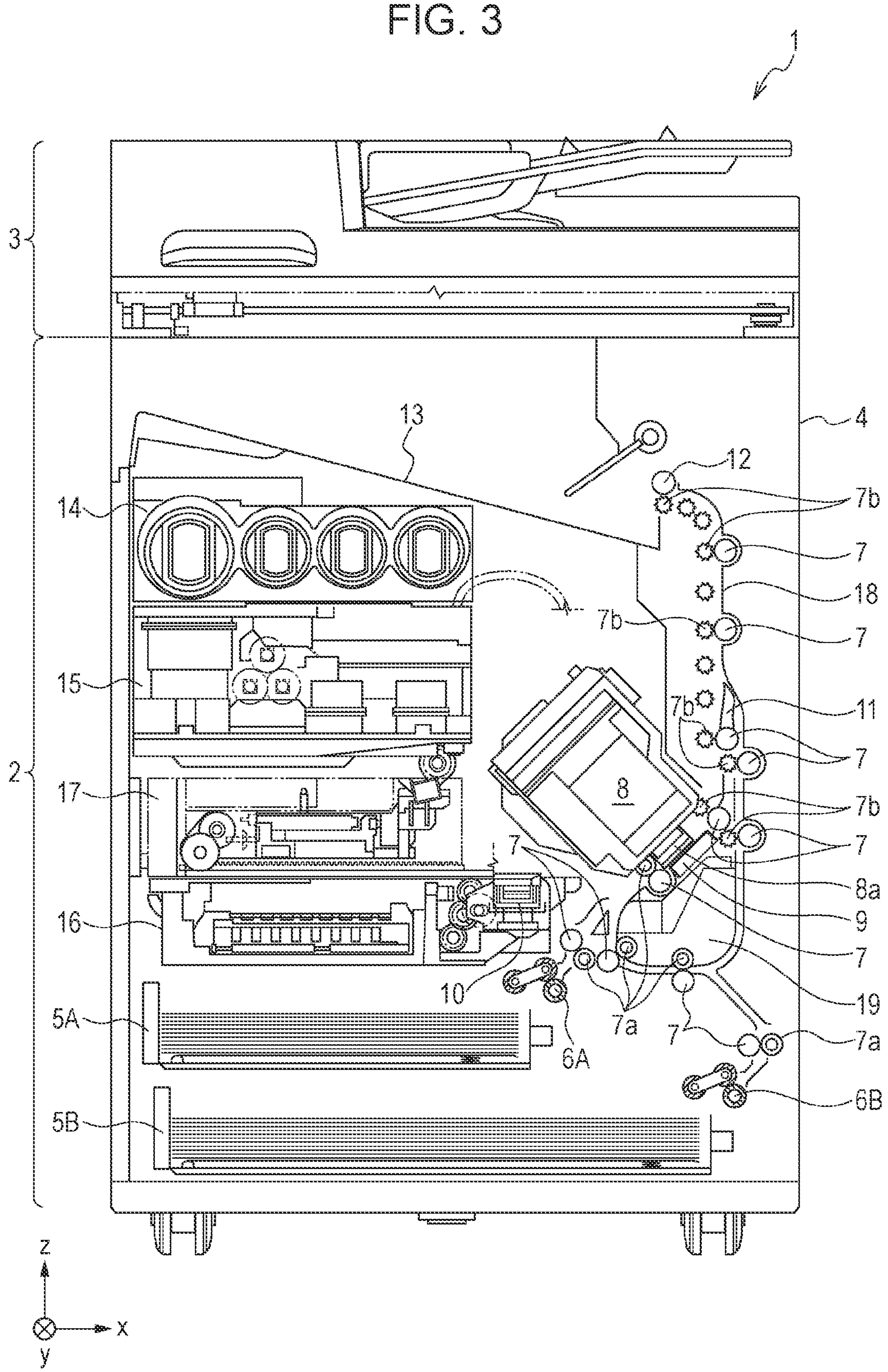
FIG. 3 illustrates the recording apparatus in a recording state.

FIG. 3 illustrates the recording apparatus 1 in the recording state. As compared with the stand-by state illustrated in FIG. 1, the cap unit 10 is separated from the ejection opening surface 8*a* of the print head 8, and the ejection opening surface 8*a* faces the platen 9. According to the present embodiment, a plane of the platen 9 is inclined at approximately 45 degrees to the horizontal direction, and the ejection opening surface 8*a* of the print head 8 in the recording position is also inclined at approximately 45 degrees to the horizontal direction, such that a distance to the platen 9 is maintained to be constant.

When the print head 8 is moved from the stand-by position illustrated in FIG. 1 to the recording position illustrated in FIG. 3, the print controller 202 lowers the cap unit 10 to an evacuating position illustrated in FIG. 3 by using the maintenance control unit 210. Thus, the ejection opening surface 8*a* of the print head 8 is separated from a cap member 10*a*. Thereafter, the print controller 202 rotates the print head 8 at 45 degrees while adjusting a height of the print head 8 in the vertical direction by using the head carriage control unit 208, so that the ejection opening surface 8*a* faces the platen 9. When the recording operation is completed and the print head 8 is moved from the recording position to the stand-by position, reversed processes of the above-described processes are performed by the print controller 202.

Next, the conveyance route of the recording medium S in the printing section 2 will be described. When the recording command is input, first, the print controller 202 moves the print head 8 to the recording position illustrated in FIG. 3 by using the maintenance control unit 210 and the head carriage control unit 208. Thereafter, the print controller 202 drives any of the first feeding unit 6A and the second feeding unit 6B according to the recording command to feed the recording medium S by using the conveyance control unit 207.

Figure 4C:
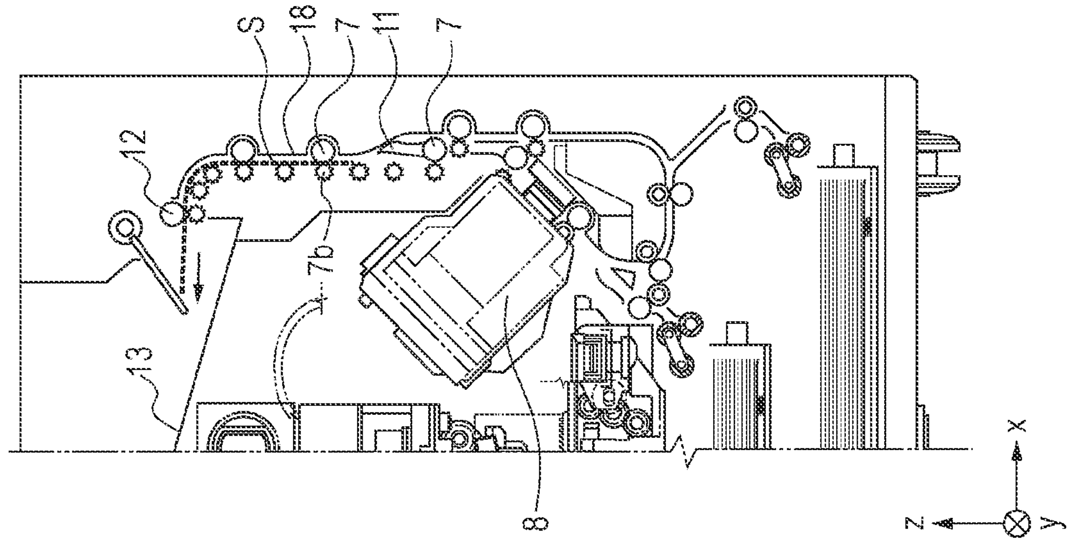
FIGS. 4A to 4C are conveyance route diagrams of a recording medium fed from a first cassette.
Figure 4B:
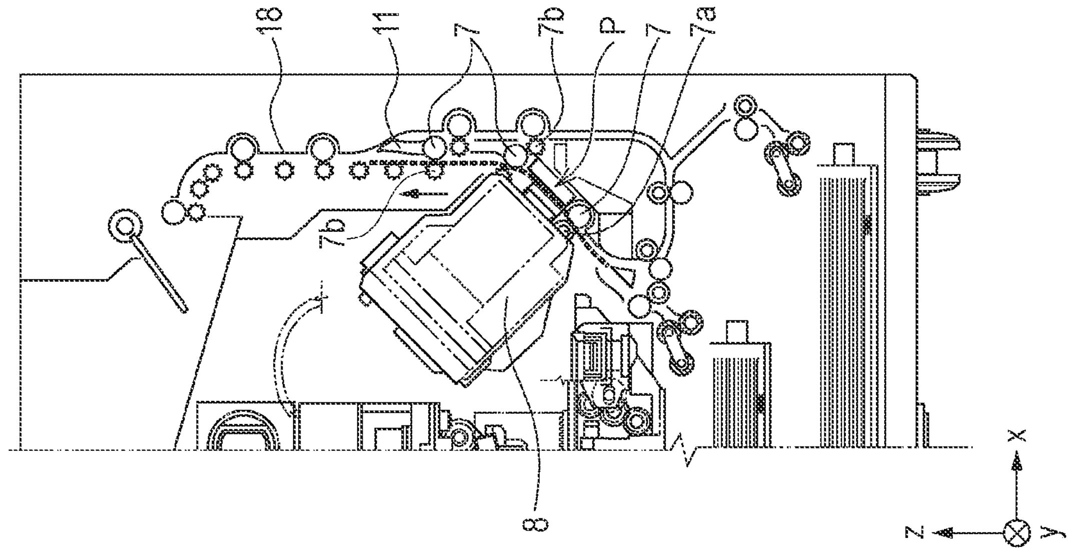
Figure 4A:
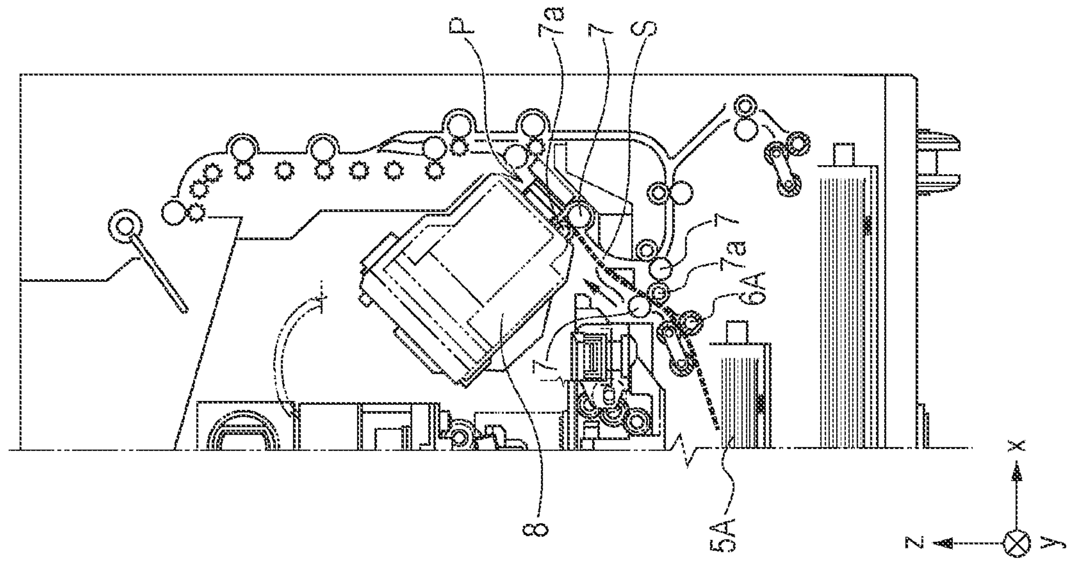

FIGS. 4A to 4C illustrate a conveyance route when the recording medium S of the A4 size which is contained in the first cassette 5A is fed. The recording medium S loaded on the top in the first cassette 5A is separated from the second and subsequent recording media by the first feeding unit 6A and conveyed towards a print area P between the platen 9 and the print head 8 while being nipped by the conveyance roller 7 and the pinch roller 7*a*. FIG. 4A illustrates a conveyance state immediately before a leading edge of the recording medium S reaches the print area P. A travelling direction of the recording medium S is changed from the horizontal direction (x direction) to a direction inclined at approximately 45 degrees to the horizontal direction during a period from the feed to the first feeding unit 6A until the arrival at the print area P.

In the print area P, ink is ejected from the plurality of ejection openings provided in the print head 8 towards the recording medium S. A rear side of the recording medium S in the area where the ink is applied is supported by the platen 9, and a distance between the ejection opening surface 8*a* and the recording medium S is maintained to be constant. While being guided by the conveyance rollers 7 and the spur rollers 7*b*, the recording medium S after the ink has been applied thereon passes through the left side of the flapper 11 where the leading edge is inclined to the right to be conveyed upwards in the vertical direction of the recording apparatus 1 along the guide 18. FIG. 4B illustrates a state in which the leading edge of the recording medium S passes through the print area P to be conveyed upwards in the vertical direction. The travelling direction of the recording medium S is changed to upwards in the vertical direction by the conveyance rollers 7 and the spur rollers 7*b* from a position of the print area P inclined at approximately 45 degrees to the horizontal direction.

After the recording medium S is conveyed upwards in the vertical direction, the recording medium S is discharged onto the discharge tray 13 by the discharge roller 12 and the spur rollers 7*b*. FIG. 4C illustrates a state in which the leading edge of the recording medium S passes through the discharge roller 12 to be discharged onto the discharge tray 13. The discharged recording medium S is held on the discharge tray 13 with the side on which the image has been recorded by the print head 8 facing down.

Figure 5A:
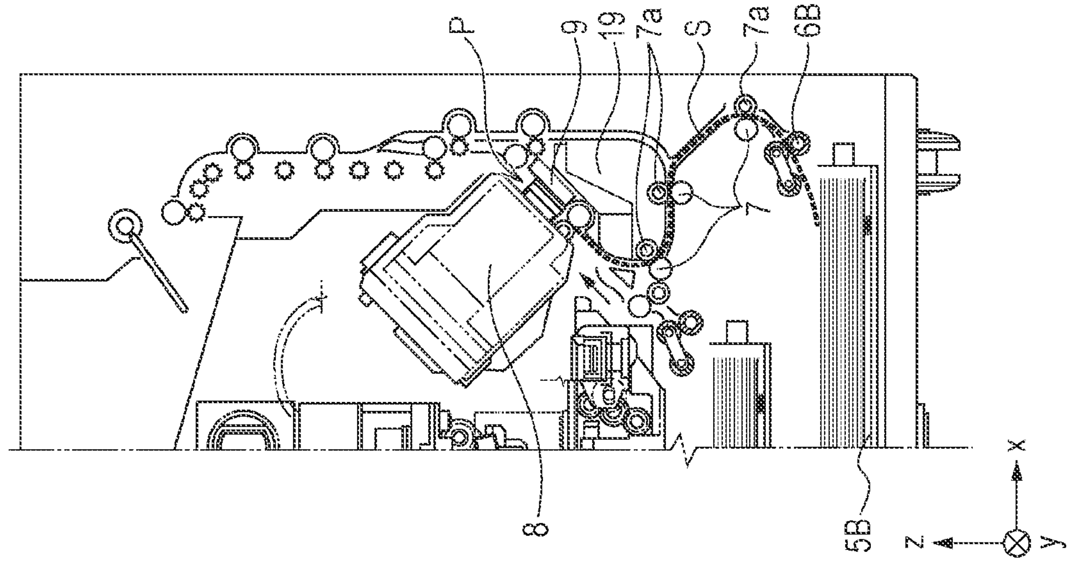
FIGS. 5A to 5C are conveyance route diagrams of a recording medium fed from a second cassette.
Figure 5B:
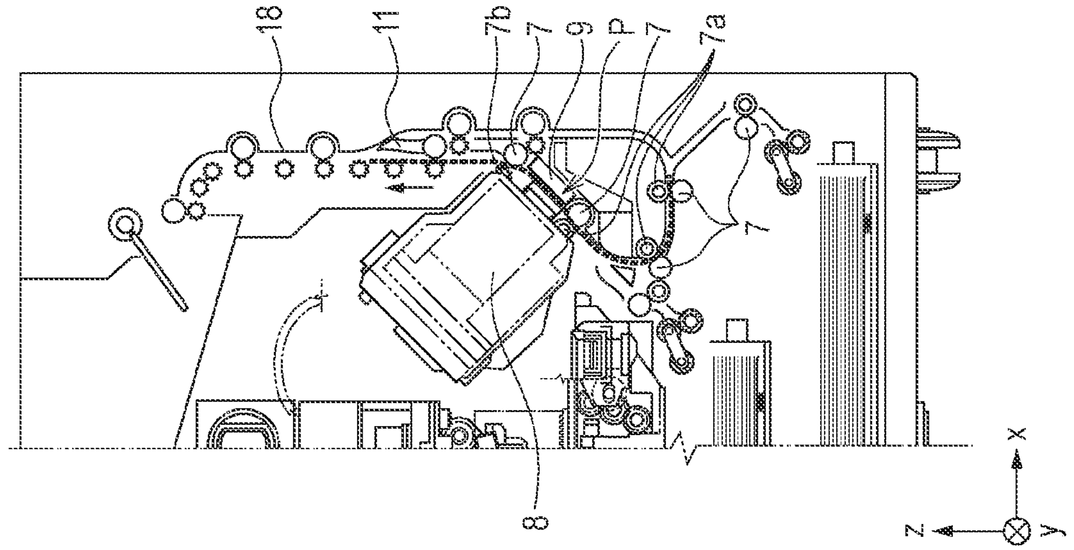
Figure 5C:
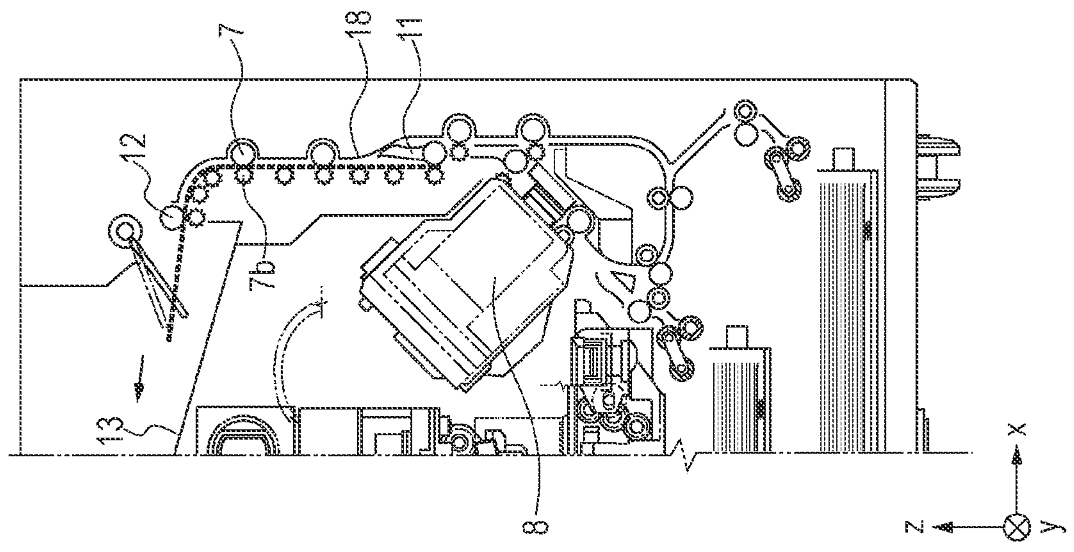

FIGS. 5A to 5C illustrate a conveyance route when the recording medium S of the A3 size which is contained in the second cassette 5B is fed. The recording medium S loaded on the top in the second cassette 5B is separated from the second and subsequent recording media by the second feeding unit 6B, and conveyed towards the print area P between the platen 9 and the print head 8 while being nipped by the conveyance roller 7 and the pinch roller 7*a*.

FIG. 5A illustrates a conveyance state immediately before the leading edge of the recording medium S reaches the print area P. In a conveyance route from the feed to the second feeding unit 6B until the arrival at the print area P, the plurality of conveyance rollers 7, the pinch roller 7*a*, and the inner guide 19 are arranged, so that the recording medium S is conveyed to the platen 9 while being bent like a letter S.

A subsequent conveyance route is similar to the case of the recording medium S of the A4 size illustrated in FIGS. 4B and 4C. FIG. 5B illustrates a state in which the leading edge of the recording medium S passes through the print area P to be conveyed upwards in the vertical direction. FIG. 5C illustrates a state in which the leading edge of the recording medium S passes through the discharge roller 12 to be discharged onto the discharge tray 13.

FIGS. 6A to 6D illustrate a conveyance route in a case where the recording operation (double-sided recording) is performed on a rear surface (second side) of the recording medium S of the A4 size. When the double-sided recording is performed, after recording on a first side (front surface), the recording operation is performed on the second side (rear surface). Since the conveyance processes when the first side is to be recorded is similar to those in FIGS. 4A to 4C, the descriptions thereof will be omitted here. Hereinafter, a conveyance process in FIG. 4C and subsequent processes will be described.

Figure 6A:
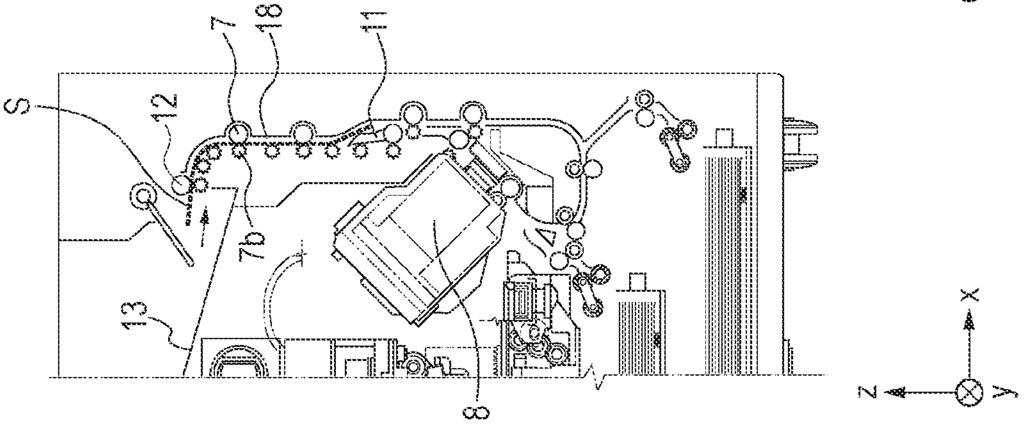
FIGS. 6A to 6D are conveyance route diagrams in a case where a recording operation is performed on a reverse face of the recording medium.

When the recording operation on the first side by the print head 8 is completed and a trailing edge of the recording medium S passes through the flapper 11, the print controller 202 reversely rotates the conveyance rollers 7 to convey the recording medium S into the inside of the recording apparatus 1. At this time, since the flapper 11 is controlled such that a leading edge thereof is inclined to the left side by an actuator which is not illustrated in the drawing, the leading edge (trailing edge in the recording operation on the first side) of the recording medium S passes through the right side of the flapper 11 to be conveyed downwards in the vertical direction. FIG. 6A illustrates a state in which the leading edge (trailing edge in the recording operation on the first side) of the recording medium S passes through the right side of the flapper 11.

Figure 6B:
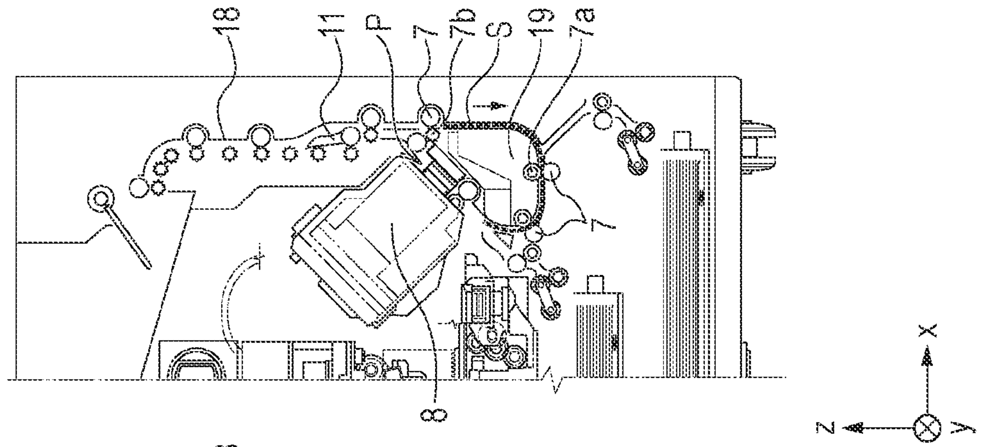

Thereafter, the recording medium S is conveyed along a curved circumference surface of the inner guide 19 to be conveyed to the print area P between the print head 8 and the platen 9 again. At this time, the second side of the recording medium S faces the ejection opening surface 8*a* of the print head 8. FIG. 6B illustrates a conveyance state immediately before the leading edge of the recording medium S reaches the print area P for the recording operation on the second side.

Figure 6C:
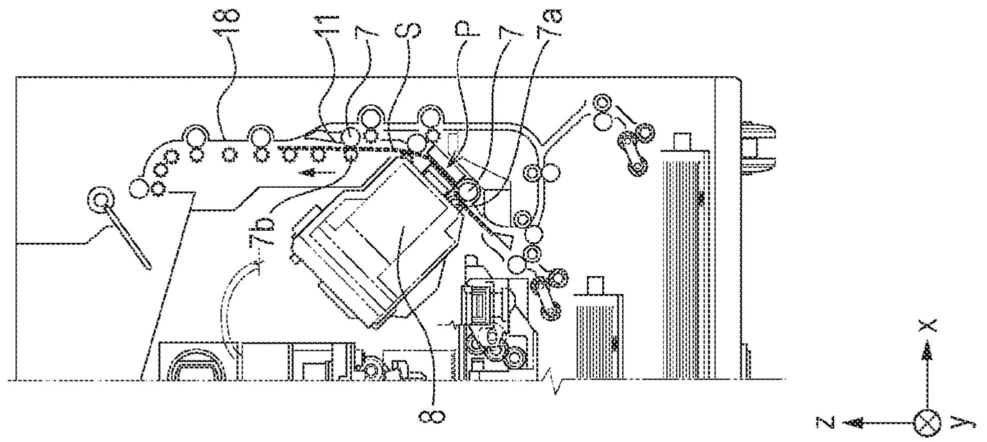
Figure 6D:
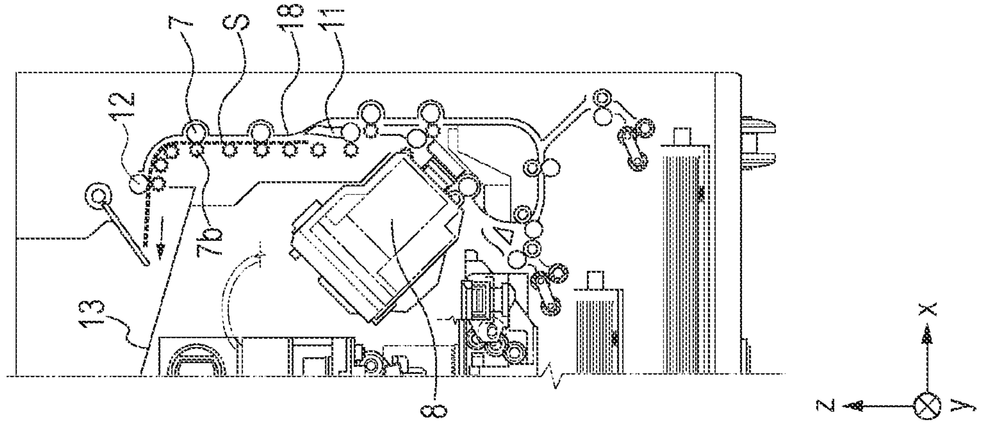

A subsequent conveyance route is similar to the case of the first side recording illustrated in FIGS. 4B and 4C. FIG. 6C illustrates a state in which the leading edge of the recording medium S passes through the print area P to be conveyed upwards in the vertical direction. At this time, the flapper 11 is controlled to be moved to the position where the leading edge is inclined to the right side by the actuator which is not illustrated in the drawing. FIG. 6D illustrates a state in which the leading edge of the recording medium S passes through the discharge roller 12 to be discharged onto the discharge tray 13.

Next, the maintenance operation on the print head 8 will be described. As described also in FIG. 1, the maintenance unit 16 of the present embodiment includes the cap unit 10 and the wiping unit 17 and actuates these at a predetermined timing to perform the maintenance operation.

Figure 7:
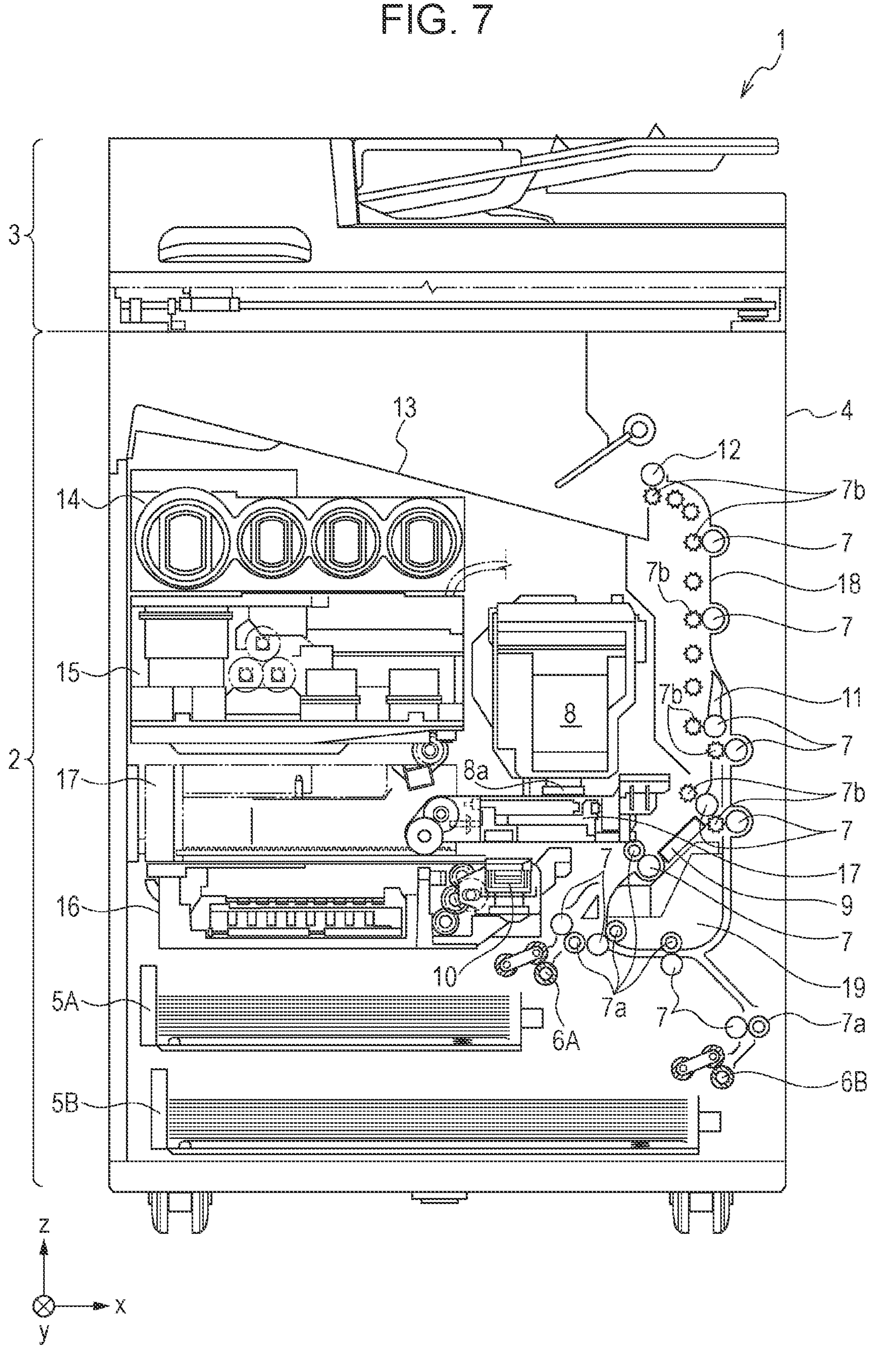
FIG. 7 illustrates the recording apparatus in a maintenance state.

FIG. 7 illustrates the recording apparatus 1 in the maintenance state. When the print head 8 is moved from the stand-by position illustrated in FIG. 1 to the maintenance position illustrated in FIG. 7, the print controller 202 moves the print head 8 upwards in the vertical direction and also moves the cap unit 10 downwards in the vertical direction. Then, the print controller 202 moves the wiping unit 17 from the evacuating position towards the right direction in FIG. 7. Thereafter, the print controller 202 moves the print head 8 downwards in the vertical direction to be moved to the maintenance position where the maintenance operation can be performed.

On the other hand, when the print head 8 is moved from the recording position illustrated in FIG. 3 to the maintenance position illustrated in FIG. 7, the print controller 202 moves the print head 8 upwards in the vertical direction while being rotated at 45 degrees. Then, the print controller 202 moves the wiping unit 17 from the evacuating position towards the right direction. Thereafter, the print controller 202 moves the print head 8 downwards in the vertical direction to be moved to the maintenance position where the maintenance operation by the maintenance unit 16 can be performed.

After the state is shifted to the maintenance state, by moving the wiping unit 17 to the left side in FIG. 7 and wiping an ejection surface 8*a* by a wiper provided in the wiping unit, it is possible to remove paper fine particles or ink droplets adhered to the ejection surface 8*a*.

When the paper fine particles or the ink droplets are removed, an ejection state of the print head 8 is recovered.

Figure 8:
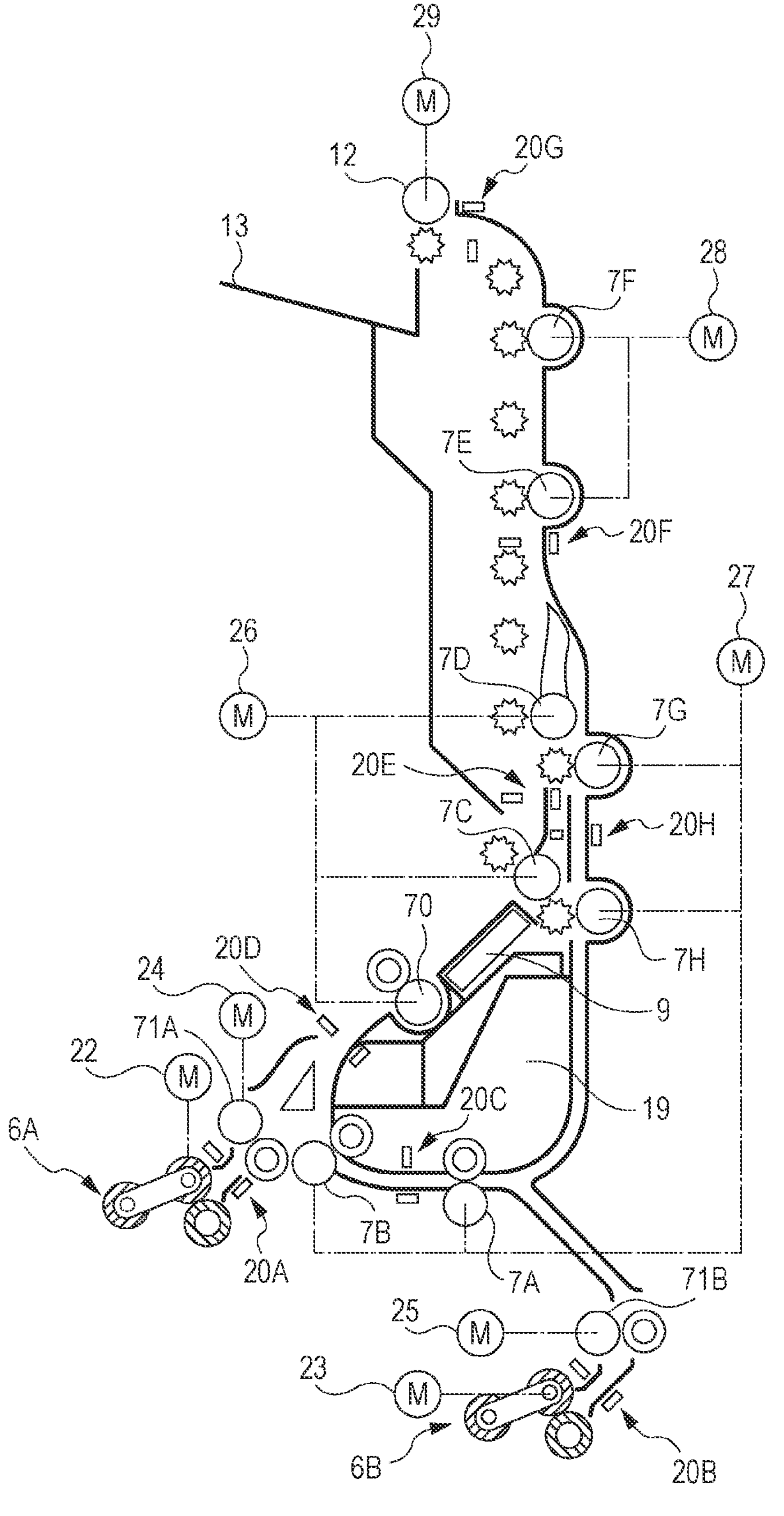
FIG. 8 illustrates a correspondence between drive rollers and motors.

FIG. 8 illustrates a correspondence between the plurality of motors and drive motors in the recording apparatus 1.

A first feeding motor 22 drives a feeding roller of the first feeding unit 6A arranged to feed the recording medium S from the first cassette 5A. A second feeding motor 23 drives a feeding roller of the second feeding unit 6B arranged to feed the recording medium S from the second cassette 5B. A first conveyance motor 24 drives a first intermediate roller 71A arranged to initially convey the recording medium S fed by the first feeding unit 6A. A second conveyance motor 25 drives a second intermediate roller 71B arranged to initially convey the recording medium S fed by the second feeding unit 6B.

A main conveyance motor 26 drives a main conveyance roller 70 arranged upstream of the platen 9 to mainly convey the recording medium S on which the recording is being performed. In addition, the main conveyance motor 26 drives two conveyance rollers 7C and 7D arranged downstream of the platen 9 to convey the recording medium S conveyed by the main conveyance roller 70 further to the downstream.

A third conveyance motor 27 drives two conveyance rollers 7G and 7H arranged to convey the recording medium S downwards on which the recoding has been performed on the first side. In addition, the third conveyance motor 27 drives two conveyance rollers 7A and 7B arranged along the inner guide 19 to convey, towards the print head 8, the recording medium S conveyed by the second intermediate roller 71B or the recording medium S on which the recoding has been performed on the first side with the front and the back reversed.

A fourth conveyance motor 28 drives two conveyance rollers 7E and 7F arranged to convey the recording medium S after the recording operation has been performed upwards or downwards. A discharge motor 29 drives the discharge roller 12 arranged to discharge the recording medium S on which the recording has been performed onto the discharge tray 13. In this manner, each of the two feeding motors 22 and 23, the five conveyance motors 24 to 28, and the discharge motor 29 is associated with one or more drive motors.

On the other hand, the detection members 20 (detection members 20A to 20H) configured to detect the presence or absence of the recording medium S are arranged in the eight positions along the conveyance route. Each of the detection members 20 is constituted by a sensor and a mirror which are arranged across the conveyance route, in which the sensor having a light emitting unit and a light receiving unit is arranged on one side of the conveyance route, and the mirror is arranged on the other side of the conveyance route in a position facing the sensor. Depending on whether light emitted from the light emitting unit of the sensor is reflected by the mirror and the light receiving unit detects this reflected light, the presence or absence of the recording medium S, that is, the passage of the leading edge or the trailing edge is determined.

The conveyance control unit 207 individually drives the feeding motors 22 and 23, the conveyance motors 24 to 28, and the discharge motor 29 based on a detection result of each of the detection members 20 and an output value of the encoder configured to detect the rotation amount of each of the drive rollers, and controls the conveyance of the entire apparatus.

Next, the maintenance control by the print controller 202 will be described. The print controller 202 has a function of receiving information of the recording medium type from the recording job input from the host apparatus 400, and reading an addition value set for each of designated recording medium types from the ROM 203 to add the addition value to a count-up value at a predetermined timing. The count-up value is saved in the RAM 204. In addition, the print controller 202 reads a maintenance threshold set for each of the recording medium types from the ROM 203. Then, the print controller 202 has a function of executing a maintenance operation for recovering the ejection state of the print head 8 by issuing a maintenance instruction to the maintenance control unit 210 in a case where the count-up value becomes a value higher than the maintenance threshold.

With reference to FIG. 9, details of the addition value and the maintenance threshold for each of the recording media will be described.

The addition value corresponds to the amount of paper fine particles generated by the recording. For example, in particular, in plain paper having pulp of a sheet exposed to a front surface without surface coat processing, dispersion of the pulp of the sheet on the sheet front surface tends to occur due to friction with the conveyance roller at the time of the conveyance of the sheet, and the amount of generated paper fine particles is high, so that a large number of the paper fine particles tend to be adhered to the print head 8. According to the present embodiment, the addition value for the plain paper is set at 100. On the other hand, in glossy paper having pulp of a sheet which is not exposed to a front surface because of the application of the surface coat processing, even when the friction with the conveyance roller occurs, dispersion of pulp fiber of the sheet hardly occurs, and the amount of generated paper fine particles is low, so that the paper fine particles are less likely to be adhered to the print head 8 as compared with the plain paper. For this reason, a value lower than that for the plain paper, herein, 10 is set for the glossy paper as the addition value. By setting the value according to the amount of generated paper fine particles for the recording medium type in this manner, it is possible to accurately estimate the amount of paper fine particles adhered to the print head 8. Herein, only the plain paper and the glossy paper are exemplified, but addition values can also be set for other paper types. In addition, addition values may also be more elaborately set, and for example, different addition values may also be set for standard glossy paper and standard semi-glossy paper.

The maintenance threshold is set for each of the recording medium types, and a higher value is set for the recording medium with less conspicuous image degradation. For example, in the plain paper often used for recording of a general business document or the like, ink tends to bleed on the paper surface due to the absence of a surface coat layer. For this reason, even when there is an ejection failure nozzle where ink is not ejected from the nozzle, since ink ejected from a surrounding nozzle bleeds and spreads, it is difficult to visually recognize the image degradation. On the other hand, the glossy paper used for recording of a picture or the like has a characteristic with which ink hardly bleed with the application of the coat processing on an ink receiving layer for suppressing degradation of sharpness caused by the ink bleeding. On the recording medium described above, when there is an ejection failure nozzle, since ink ejected from a surrounding nozzle hardly bleeds and spreads to a position in which the ink is to be ejected from the ejection failure nozzle, and the position in which the ink is to be ejected from the ejection failure nozzle remains blank, and the blank position is easily visually recognized as the image degradation. As described above, the number of ejection failure nozzles with which the image degradation is visually recognized in the glossy paper is lower than the number of ejection failure nozzles with which the image degradation is visually recognized in the plain paper. For this reason, the maintenance threshold set for the glossy paper (1000 according to the present embodiment) is a value lower than the maintenance threshold set for the plain paper (15000 according to the present embodiment), and the maintenance operation is to be executed at a timing at which the count-up value is lower than that for the plain paper. In this manner, by deciding the execution timing of the maintenance operation according to the type of the recording medium on which the recording is to be performed, for each of types of the recording media, it is possible to suppress the visual recognition of the image degradation caused by the ejection failure nozzles produced by the paper fine particles adhered to the print head 8.

Figure 10:
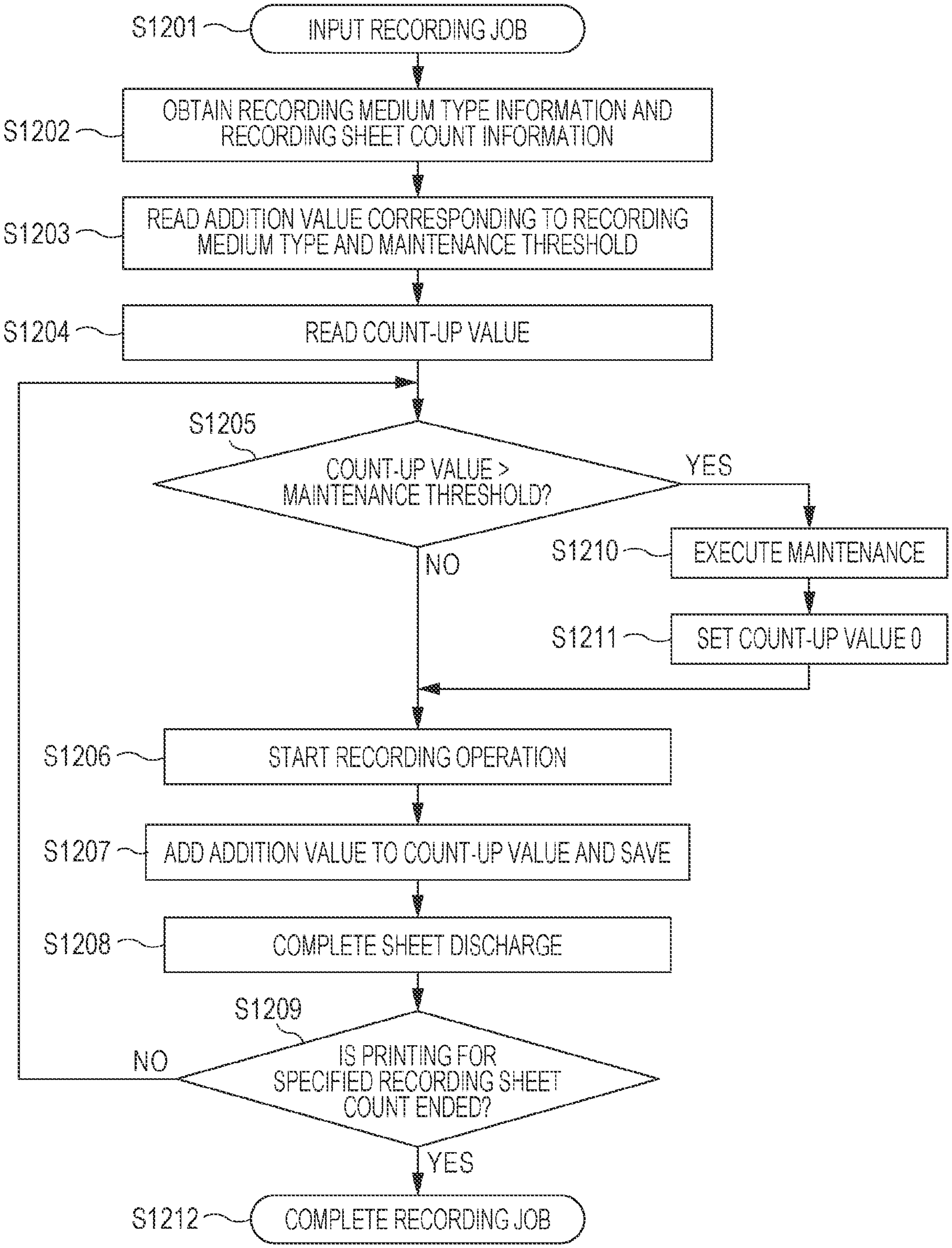
FIG. 10 is a flowchart of the recording operation according to a first embodiment.

FIG. 10 is a flowchart illustrating a flow of an operation when the recording is performed. The present processing is performed when the print controller 202 controls the respective processes, the respective control units, or the like according to the program stored in the ROM 203. The present processing is started when the recording job from the host apparatus 400 is input to the recording apparatus 1.

First, in step S1201, the recording job is input from the host apparatus 400. Hereinafter, a description will be provided where a case is used as an example in which the recording job with the recording sheet count of "100 sheets" is input under a setting that a type of the recording medium to be recorded as a first recording job is the "plain paper".

Next, in step S1202, the print controller 202 obtains the recording medium type information and the recording sheet count information from the recording job. Then, the print controller 202 reads the addition value of 100 and the maintenance threshold of 15000 corresponding to the plain paper from the ROM 203 in step S1203, and reads the count-up value saved in the RAM 204 in step S1204. The description will be provided where the count-up value read in step S1204 is "0" corresponding to an initial value herein, but the value varies depending on a history of the recording or the operation of the recording apparatus.

Subsequently, in step S1205, the print controller 202 compares the count-up value read in step S1204 with the maintenance threshold read in step S1203. Since the maintenance threshold is 15000 against the current count-up value of 0, the flowchart proceeds to step S1206, and the recording operation is started. Specifically, a series of operations such as shift processing (for example, an adjustment of the ink flow rate to the print head 8 by the ink supply unit 15) to the recording states of various types of units is started.

In step S1207, first, in the series of recording operations, the print controller 202 is notified by a sheet detection unit 212 that from the cassette unit where the plain paper is set as the recording medium, the recording medium is fed to the position where the recording can be performed by the print head 8. When the notification is received, the print controller 202 adds the addition value for the plain paper of 100 to the count-up value, and saves the count-up value of 100 after the addition in the RAM 204. The recording apparatus 1 still continues the series of recording operations, and the sheet detection unit 212 detects that the recording medium is discharged onto the discharge tray 13, so that the print controller 202 is notified of that effect (step S1208). Then, in step S1209, the print controller 202 determines whether or not the recording for the specified recording sheet count is completed. In this stage, the recording is performed for the first sheet out of the specified recording sheet count of 100, the flowchart returns to step S1205, and then shifts to the execution of the recording operation for the second and subsequent sheets. In the recording operation for the second sheet too, similarly as in the recording for the first sheet, the recording operation continues while the count-up value is compared with the maintenance threshold. When the recording for the 100th sheet is completed, each of the units is operated from the recording state to the stand-by state, and the series of recording jobs is completed (step S1212). In the first recording job, the final count-up value becomes 10000 (=the addition value of 100×100 sheets) but is a value lower than the maintenance threshold of 15000, so that the maintenance is not executed during the first recording job.

Subsequently, when the recording job with the recording sheet count of "1 sheet" under a setting that the recording medium type is the "glossy paper" is input from the host apparatus 400 as a second recording job (step S1201), the print controller 202 obtains the recording medium type information and the recording sheet count information from the recording job (step S1202), reads the addition value of 10 and the maintenance threshold of 1000 corresponding to the glossy paper from the ROM 203 (step S1203), and reads the count-up value of 10000 saved in the RAM 204 (step S1204). Subsequently, the count-up value is compared with the maintenance threshold (step S1205). Since the maintenance threshold is 1000 against the current count-up value of 10000, in step S1210, the print controller 202 issues the maintenance instruction to the maintenance control unit 210, and the maintenance control unit 210 executes the maintenance operation (recovery operation). According to the present embodiment, wiping is performed as the maintenance operation. As described above, the wiping is performed such that the ejection opening surface 8*a* of the print head 8 is wiped by the wiper provided in the wiping unit 17.

In step S1211, to reflect a state in which the paper fine particles adhered to the print head 8 have been removed by the maintenance operation executed in step S1210, the print controller 202 sets the initial value of 0 for the count-up value to be saved in the RAM 204. Subsequently, the flowchart proceeds to step S1206, and similarly as in the time of the execution of the first recording job, the series of recording operations on the glossy paper is executed, and the second recording job is ended (step S1212).

In this manner, before the execution of the recording on the recording medium on which the image degradation is easily visually recognized, the maintenance operation is performed to execute the removal of the paper fine particles adhered to the print head 8, so that the recording can be performed such that the visual recognition of the image degradation is suppressed.

As described above, the execution timing of the maintenance operation is decided according to the type of the recording medium on which the recording is performed, and it is possible to execute the maintenance operation at the appropriate timing. Thus, irrespective of the type of the recording medium on which the recording is to be performed, it is possible to suppress the visual recognition of the image degradation due to the ejection failure nozzles produced by the paper fine particles adhered to the print head 8. In addition, since the excessive execution of the maintenance operation can be suppressed, the number of times for the user to wait for the completion of the maintenance operation is decreased, and the decrease in the usability of the user can be suppressed. In addition, since the number of times to execute the maintenance operation is decreased, the friction with the ejection opening surface by wiping can be suppressed, and life of the print head can be extended.

Second Embodiment

According to the present embodiment, before the recording operation for the first sheet of the recording job is started, the count-up value at the end of the recording job is previously calculated to be compared with the maintenance threshold, and the maintenance is executed when the count-up value at the end of the recording job exceeds the maintenance threshold. A different part from the first embodiment will be mainly described, and a description of a similar part may be omitted.

Figure 11:
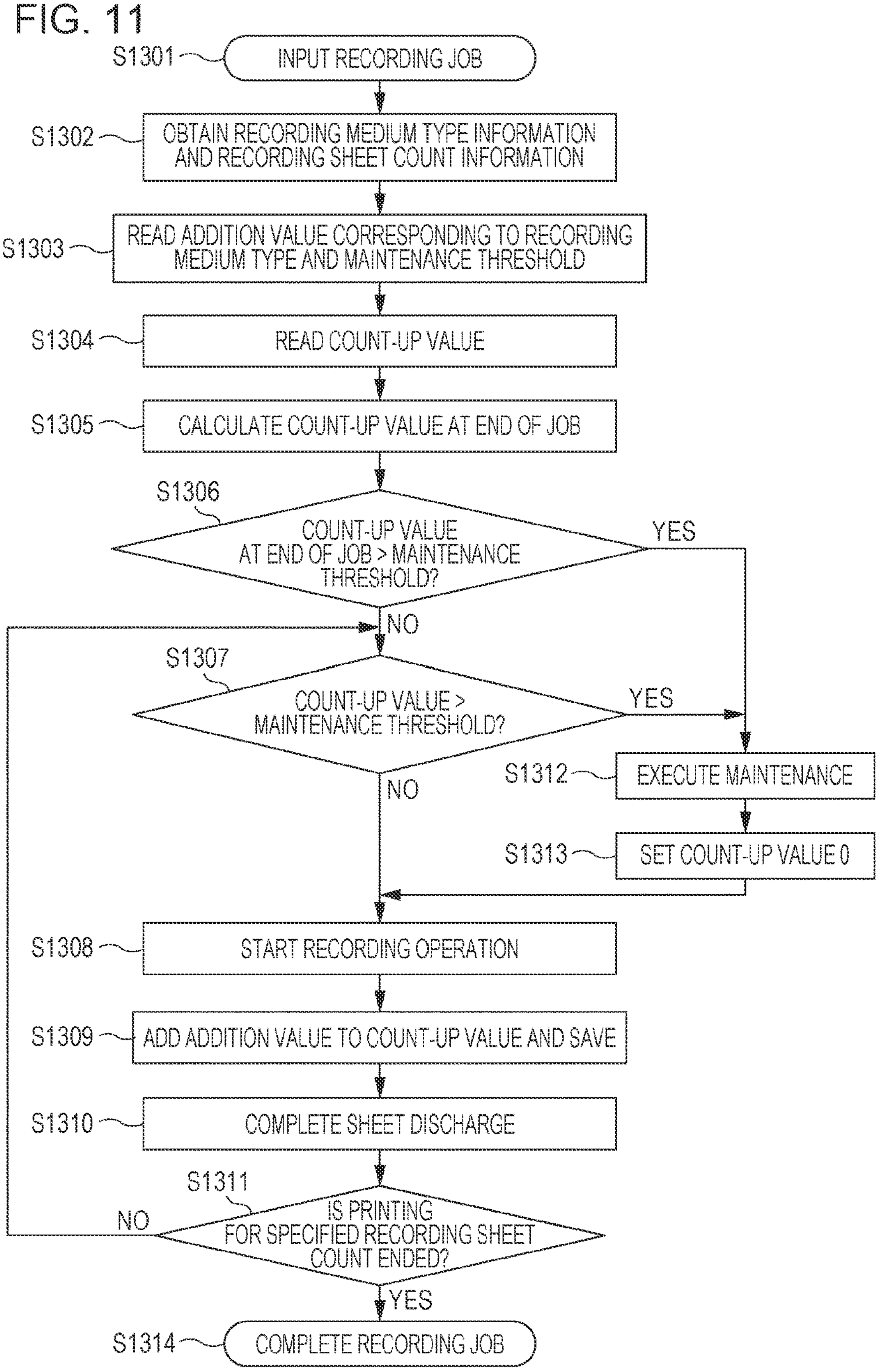
FIG. 11 is a flowchart of the recording operation according to a second embodiment.

FIG. 11 is a flowchart illustrating a flow of an operation when the recording according to the present embodiment is performed. The present processing is performed when the print controller 202 controls the respective processes, the respective control units, or the like according to the program stored in the ROM 203. The present processing is started when the recording job from the host apparatus 400 is input to the recording apparatus 1.

In step S1301, the recording job is input from the host apparatus 400. Hereinafter, a description will be provided where a case is used as an example in which the recording job with the recording sheet count of "9 sheets" under a setting that the recording medium type is the "plain paper" is input as the first recording job.

Next, in step S1302, the print controller 202 obtains the recording medium type information and the recording sheet count information from the recording job. Then, in step S1303, the print controller 202 reads the addition value of 100 and the maintenance threshold of 15000 corresponding to the plain paper from the ROM 203, and reads the count-up value saved in the RAM 204 in step S1304. The description will be provided where the count-up value read in step S1304 is "0" corresponding to the initial value herein, but the value varies depending on the history of the recording or the operation of the recording apparatus.

Subsequently, in step S1305, the print controller 202 performs a calculation of the count-up value at the end of the job. With regard to the calculation of the count-up value at the end of the job, the calculation is performed by adding a value obtained by multiplying the addition value by the number of printing sheets set in the job to the current count-up value. Specifically, a value of 900 obtained by multiplying the addition value for the plain paper of 100 by the recording sheet count of 9 is added to the current count-up value of 0. As a result, the count-up value at the end of the job becomes 900.

In step S1306, the print controller 202 compares the count-up value at the end of the job which is calculated in step S1305 with the maintenance threshold read in step S1303. At this time, since the maintenance threshold is 15000 against the count-up value at the end of the job of 900, the flowchart progresses to step S1307, and the maintenance operation is not executed.

In step S1307, the print controller 202 compares the count-up value read in step S1304 with the maintenance threshold read in step S1303.

Since the maintenance threshold is 15000 against the current count-up value of 0, the flowchart progresses to step S1308, and the maintenance operation is not executed.

In steps S1308 to S1311, processing similar to steps S1206 to S1209 of FIG. 10 according to the first embodiment is performed.

When the recording for the ninth sheet is completed, each of the units is operated from the recording state to the stand-by state, and a series of recording jobs is completed (step S1314). In the first recording job, since the final count-up value becomes 900 (=the addition value 100×9 sheets) but is a value lower than the maintenance threshold of 15000, the maintenance is not executed during the first recording job.

Subsequently, the recording job with the recording sheet count of "20 sheets" under a setting that the recording medium type is the "glossy paper" is input from the host apparatus 400 as the second recording job (step S1301), the print controller 202 obtains the recording medium type information and the recording sheet count information from the recording job (step S1302), reads the addition value of 10 and the maintenance threshold of 1000 corresponding to the glossy paper from the ROM 203 (step S1303), and reads the count-up value saved in the RAM 204 (step S1304).

Subsequently, the calculation of the count-up value at the end of the job is performed (step S1305). For the count-up value at the end of the job, a value of 200 obtained by multiplying the glossy paper addition value of 10 in the second recording job by the specified recording sheet count of 20 is added to the value at the end of the first recording job of 900. As a result, the count-up value at the end of the job becomes 1100 (step S1305). Subsequently, the count-up value at the end of the job is compared with the maintenance threshold (step S1306). At this time, since the maintenance threshold is 1000 against the count-up value at the end of the job 1100, the print controller 202 issues the maintenance instruction to the maintenance control unit 210, and the maintenance control unit 210 executes the maintenance operation (step S1312).

According to the present embodiment, similarly as in the first embodiment, wiping is performed as the maintenance operation. In step S1313, to reflect a state in which the paper fine particles adhered to the print head 8 have been removed by the maintenance operation, the print controller 202 sets the initial value of 0 for the count-up value to be saved in the RAM 204. Subsequently, similarly as in the time of the execution of the first recording job, the recording operation on the glossy paper is executed, and the second recording job is ended (S1314).

In this manner, under the control using the count-up value at the end of the job, in a case where it is possible to predict that the maintenance operation is to be executed during the process of the recording of the recording job, the maintenance operation can be executed before the start of the recording operation of the recording job. The user often feels that the recording takes a longer period of time in a case where the maintenance operation is performed during the recording operation is performed as compared with a case where the maintenance operation is performed before the recording operation even when those recording processes take the same period of time. For this reason, the maintenance operation before the start of the recording operation is executed. Thus, it is possible to suppress the decrease in the usability of the user from the feeling that the recording operation has stopped because the maintenance is executed during the execution of the recording job. In addition, at the time of the shift to the maintenance operation, a period of time for shifting the position and the state of each of the units in the recording state to the state necessary for the maintenance execution and a recording interruption period of time due to a situation where the maintenance operation is executed along after the state shift are generated. However, by executing the maintenance operation before the start of the recording operation, when the maintenance operation is executed in parallel with an initialization operation (for example, an operation for adjusting an ink pressure into the inside of the print head 8, a flow rate, or the like) necessary for the reduction in the period of time for the shift from the recording state to the maintenance state or the shift from the stand-by state before the start of the recording operation to the recording state, the increase in the recording interruption period of time due to the execution of the maintenance operation alone can be suppressed, and the recording period of time from the input of the recording job to the completion of the recording job can be reduced.

According to the embodiment described above, the execution timing of the maintenance can be appropriately set.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-161546, filed Sep. 30, 2021, which is hereby incorporated by reference herein in its entirety.

What is claimed is:

1. A recording apparatus comprising:

a print head configured to form an image by applying a recording material to a recording medium according to image data;

a recovery unit configured to perform a recovery operation for recovering an ejection state of the print head;

a type obtaining unit configured to obtain a type of the recording medium on which the image is to be recorded according to the image data;

a threshold obtaining unit configured to obtain a threshold for performing the recovery operation corresponding to the type of the recording medium which is obtained by the type obtaining unit; and a calculation unit configured to calculate a count-up value by adding, in response to recording on the recording medium, an addition value set for each of types of recording media, wherein the recovery operation by the recovery unit is performed in a case where the count-up value calculated by the calculation unit exceeds the threshold obtained by the threshold obtaining unit.

2. The recording apparatus according to claim 1, wherein the recovery operation by the recovery unit is performed before formation of the image by the print head is started.

3. The recording apparatus according to claim 1, wherein the recording apparatus receives a recording job including a series of image data for performing a recording operation, wherein the calculation unit calculates the count-up value when the recording job is ended based on the number of recording media on which recording included in the recording job is performed and the addition value set for the type of the recording medium on which the recording is performed when the recording of the recording job is performed, and wherein, in a case where the count-up value exceeds the obtained threshold, the recovery unit performs the recovery operation before the recording of the recording job is performed.

4. The recording apparatus according to claim 1, wherein the print head has an ejection opening surface on which an ejection opening is formed, and the image is formed on the recording medium by ejecting ink from the ejection opening, and wherein the recovery unit performs an operation for wiping the ejection opening surface of the print head by a wiper as the recovery operation.

5. The recording apparatus according to claim 1, wherein the addition value is set based on an amount of paper fine particles generated when the recording is performed by the print head.

6. The recording apparatus according to claim 1, wherein an addition value of glossy paper is set to be higher than an addition value of plain paper.

7. The recording apparatus according to claim 1, wherein the print head has an ejection opening surface on which a plurality of ejection openings are formed, and an image is formed on the recording medium by ejecting ink from each of the plurality of ejection openings, and wherein the obtained threshold is set based on an effect on the image due to generation of an ejection failure opening where the ink is not to be ejected from the ejection opening when recording of the image by the print head is performed.

8. The recording apparatus according to claim 1, wherein, in a case where the type of the recording medium on which the image is recorded according to the image data, the obtained threshold is set to be a value for glossy paper that is lower than a value set in a case where the type of the recording medium is plain paper.

9. A method for a recording apparatus having a print head configured to form an image by applying a recording material to a recording medium according to image data, the method comprising:

performing a recovery operation for recovering an ejection state of the print head;

obtaining a type of the recording medium on which the image is to be recorded according to the image data;

obtaining a threshold for performing the recovery operation corresponding to the type of the recording medium which is obtained; and calculating a count-up value by adding, in response to recording on the recording medium, an addition value set for each of types of recording media, wherein performing the recovery operation includes performing the recovery operation in a case where the calculated count-up value exceeds the obtained threshold.

10. The method according to claim 9, wherein the recovery operation is performed before formation of the image by the print head is started.

11. The method according to claim 9, further comprising receiving, in the recording apparatus, a recording job including a series of image data for performing a recording operation, wherein calculating includes calculating the count-up value when the recording job is ended based on the number of recording media on which recording included in the recording job is performed and the addition value set for the type of the recording medium on which the recording is performed when the recording of the recording job is performed, and wherein, in a case where the count-up value exceeds the obtained threshold, performing the recovery operation includes performing the recovery operation before the recording of the recording job is performed.

12. A non-transitory computer-readable storage medium storing a program to cause a computer to perform a method for a recording apparatus having a print head configured to form an image by applying a recording material to a recording medium according to image data, the method comprising:

performing a recovery operation for recovering an ejection state of the print head;

obtaining a type of the recording medium on which the image is to be recorded according to the image data;

obtaining a threshold for performing the recovery operation corresponding to the type of the recording medium which is obtained; and calculating a count-up value by adding, in response to recording on the recording medium, an addition value set for each of types of recording media, wherein performing the recovery operation includes performing the recovery operation in a case where the calculated count-up value exceeds the obtained threshold.

* * * * *